Sept. 1, 1959     E. B. WHITLOCK     2,901,877
CORN PICKERS

Filed June 14, 1957     2 Sheets-Sheet 1

INVENTOR
EDWIN B. WHITLOCK

BY *Alfred W. Petchaft*

ATTORNEY

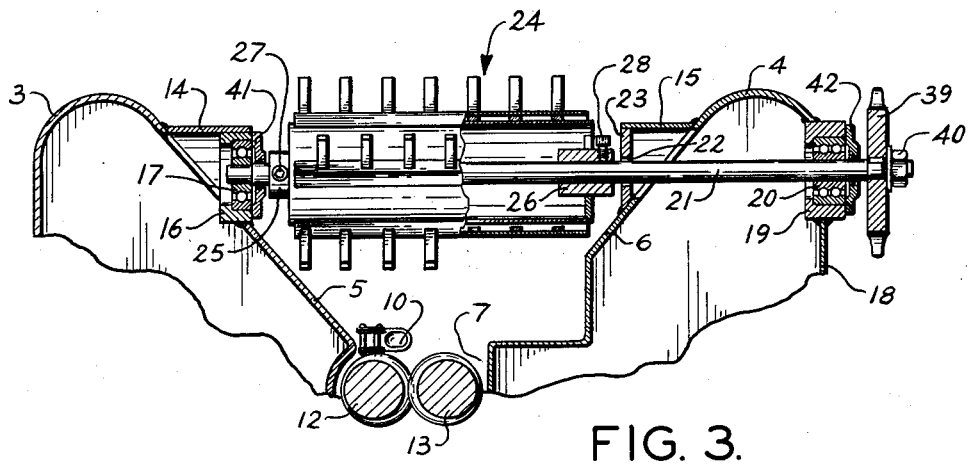
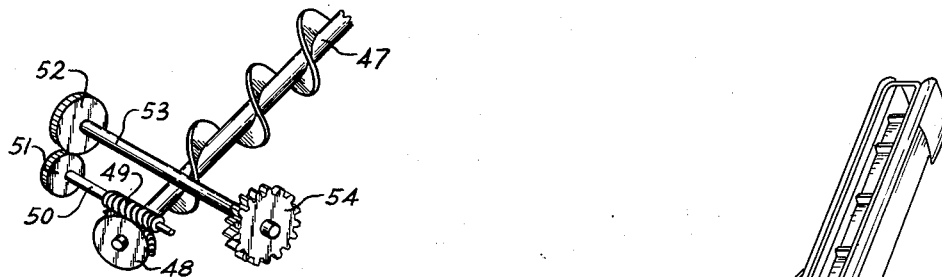
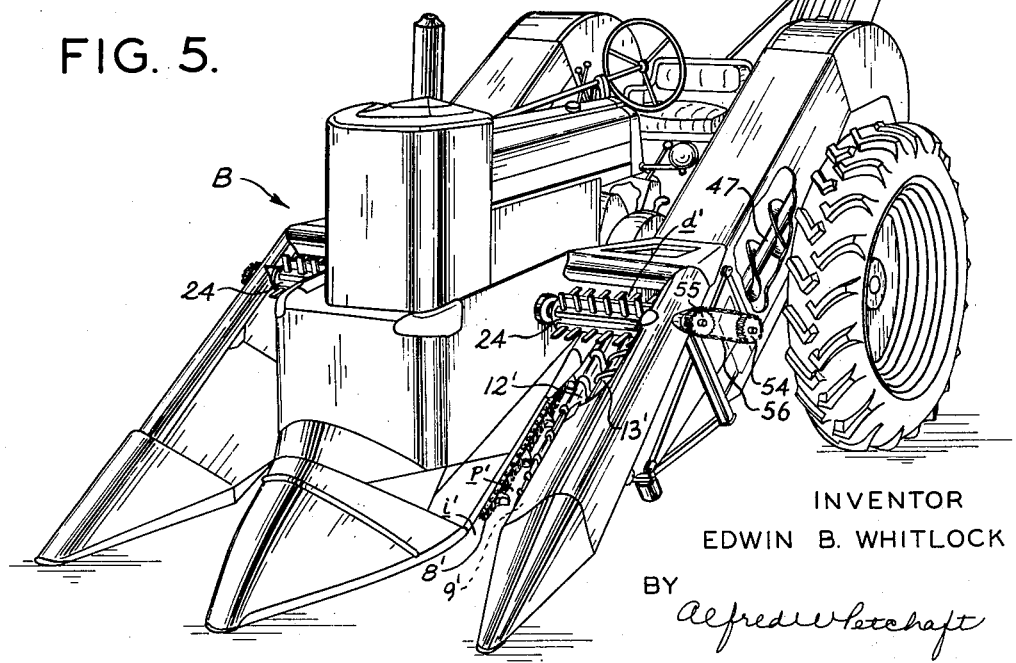

United States Patent Office 2,901,877
Patented Sept. 1, 1959

2,901,877
CORN PICKERS
Edwin B. Whitlock, Carrollton, Ill.
Application June 14, 1957, Serial No. 665,842
4 Claims. (Cl. 56—104)

This invention relates in general to harvesting and, more particularly, to a corn picking machine.

All mechanical corn pickers presently in use employ one or more pairs of so-called "snapping rolls." Such rolls comprise a pair of spaced parallel shafts, the longitudinal axes of which are upwardly inclined from the forward or intake end of the picker and are more or less aligned with intended forward line of travel thereof, so that as the picker moves down a row of corn, the lower end of the stalks will slide freely into the space between the shafts. The shafts are also integrally provided with oppositely convoluted spiral ridges which pull the stalks down as they move into the picker; thereby stripping or "snapping" the ears of corn from the stalk. Frequently, however, and especially when the corn is very dry, the stalks break off and become entangled or jammed at the uppermost end of the snapping roller mechanism. When this occurs, it is necessary to stop the corn picker and remove the jammed stalks. Obviously, this procedure is time consuming, expensive, and slows down corn picking operations. For this reason, many farmers will not take the time to shut down the jammed machine but, instead, attempt to unclog the snapping roll mechanism while the machine is running. This, of course, is exceedingly dangerous and, as a result, there is an alarmingly high rate of accidents and death. In fact, corn pickers are generally considered the most dangerous mechanical device used in farming.

It is, therefore, one of the objects of the present invention to provide a corn picker embodying means which prevents the stalks from jamming within the snapping roller mechanism.

It is also an object of the present invention to provide a corn picker of the type stated which is safe and efficient in operation.

It is a further object of the present invention to provide anti-jamming means of simple and inexpensive construction which can be adapted to, or incorporated in, any currently available type of corn picker.

With the above and other objects in view, my invention resides in the novel features of form, construction, arrangement, and combination of parts presently described and pointed out in the claims.

Figure 1:
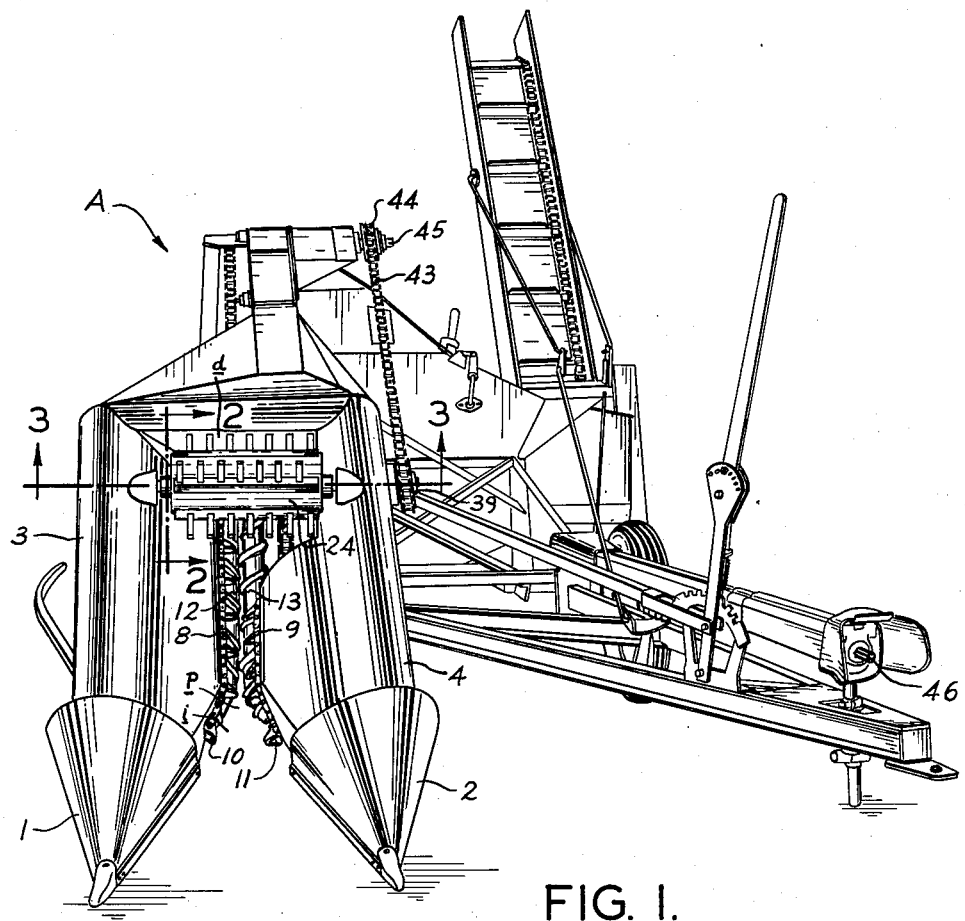
Figure 2:
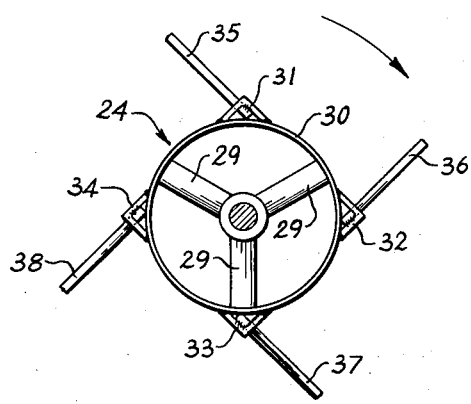

In the accompanying drawings:

Fig. 1 is a perspective view of a single row corn picker constructed in accordance with and embodying the present invention;

Figs. 2 and 3 are enlarged fragmentary sectional views taken along lines 2—2 and 3—3, respectively, of Fig. 1;

Fig. 4 is a perspective view, partly broken away, and showing a two-row corn picker constructed in accordance with and embodying the present invention; and Fig. 5 is a fragmentary perspective view showing the drive for the attachment on the two-row corn picker shown in Fig. 4.

Referring now in more detail and by reference characters to the drawings, which illustrate practical embodiments of the present invention, A designates a single-row corn picker including spaced somewhat conical gathering points 1, 2, having upwardly and rearwardly inclined spaced gathering elements or sheets 3, 4, extending therefrom. The gathering sheets 3, 4, are formed with opposed generally inclined sections 5, 6, which extend downwardly toward each other and terminate in the provision of a channel 7. Operatively mounted within the channel 7 are co-operating gathering chains 8, 9, each provided with gathering hooks 10, 11, and positioned slightly below the gathering chains 8, 9, and also in the channel 7 are inclined co-operating spirally ribbed snapping rollers 12, 13. Thus, the gathering sheets 3, 4 and snapping rollers 12, 13 define a passageway $p$ having an intake end $i$ and discharge end $d$.

Adjacent their upper rear ends, the inclined sections 5, 6, are provided with opposed inwardly extending flanges 14, 15, the flange 14 co-operating with the inclined section 5 to rigidly support a bearing retainer 16 into which is fitted a ball-bearing 17. On its outer wall 18, the gathering sheet 4 has welded therein a bearing retainer 19 which rigidly supports a ball-bearing 20 in spaced aligned relation with the bearing 17. Journaled in the bearings 17, 20, and extending transversely of the snapping rollers 12, 13, is a shaft 21 which also projects through an aperture 22 formed in a plate 23, the latter, in turn, being welded to the flange 15 and inclined section 6. Mounted on the shaft 21 is an anti-jamming member 24 comprising spaced hubs 25, 26, each being provided with set screws 27, 28, by which the member 24 may be rigidly secured to the shaft 21. Extending radially outwardly from the hubs 25, 26, is a plurality of supporting ribs 29, which, at their outer peripheries, rigidly support a cylindrical shell 30, and welded or otherwise rigidly secured to the cylindrical shell 30 are four L-shaped channel members 31, 32, 33, 34, preferably disposed 90° from each other and each having a plurality of aligned outwardly projecting flat fingers 35, 36, 37, 38, welded thereto, such that the fingers 35, 37, are preferably parallel to each other and, similarly, the fingers 36, 38, are parallel to each other. It will, therefore, be apparent that the fingers 35, 36, 37, 38 all lie in planes parallel to the axis of rotation of the shaft 21.

At its outer end, the shaft 21 is provided with a sprocket 39 secured thereon by means of a nut 40 and, if desired, seals 41, 42, are mounted on the shaft adjacent the bearings 17, 20, respectively. The sprocket 39 is operatively connected by a roller chain 43 to a sprocket 44 mounted on a power take-off shaft 45 so that as the member 24 is driven, the outer peripheries of the fingers 35, 36, 37, 38, will pass in upwardly spaced relation to the snapping rollers 12, 13, and comb down any loose ears, husks, or broken stalks which tend to gather at the upper end of the snapping roller mechanism.

In use, the corn picker A is pulled by a suitable tractor (not shown) which also drives the corn picker A through a coupling-spline 46, the latter being operatively connected through a driving system to the shaft 45. In connection with the present invention, it should be noted that the precise mechanical details of construction of the driving system, husking rollers, conveyors, and the like, of the corn picker A are conventional and are, therefore, not shown or described in detail. As the corn picker A moves along a row of corn, the stalks will pass between the gathering points 1, 2, and will be grasped by the gathering hooks 10, 11, on the chains 8, 9, whereupon, the corn stalks will be forced between the snapping rollers 12, 13, which strip the ears of corn from the stalks. At the same time, the fingers 35, 36, 37, 38, will rotate in the direction shown by the arrow in Fig. 2, so as to create a downward pressure, tending to pull the stalks downwardly and inwardly and keep them in contact with the snapping rollers 12, 13, and thereby prevent the stalks from jamming the snapping rollers 12, 13.

It is also possible to provide a two-row corn picker B, as shown in Fig. 4, which includes gathering chains 8', 9', and snapping rollers 12', 13', defining a passageway p' having an intake end i' and discharge end d', all similar to the gathering chains 8, 9, snapping rollers 12, 13, passageway p, intake end i, and discharge end d, previously described. However, in the case of a two-row corn picker B, two members 24 are provided, one for each set of snapping rollers 12', 13'. The corn picker B also includes a husking auger 47 for each set of snapping rollers 12', 13', the lower end of the auger 47 being provided with a gear 48 which drives a worm 49 on a worm shaft 50. Mounted on the worm shaft 50 is a gear 51 which meshes with a gear 52 on a countershaft 53, one end of which is provided with a sprocket 54. Operatively connecting the sprocket 54 with a sprocket 55 is a roller chain 56, the sprocket 55 being similar to the sprocket 39 previously described, and adapted to drive the member 24.

It should be understood that changes and modifications in the form, construction, arrangement, and combination of the several parts of the corn pickers may be made and substituted for those herein shown and described without departing from the nature and principle of my invention.

Having thus described my invention, what I claim and desire to secure by Letters Patent is:

1. A corn picker comprising spaced inclined gathering elements, co-operating snapping rollers operatively mounted in the space between said gathering elements, the longitudinal axes of said snapping rollers being substantially parallel to each other and disposed at a forwardly and downwardly inclined angle to the ground, said snapping rollers furthermore being so positioned that a transverse perpendicular line between their longitudinal axes is substantially parallel to the ground, a shaft operatively journaled in and extending transversely between the gathering elements, the longitudinal axis of said shaft being parallel to said transverse line between the longitudinal axes of the snapping rollers, a cylindrical shell mounted on said shaft in upwardly spaced relation from said snapping rollers, channel members secured to the outer periphery of said cylindrical shell, and a plurality of rigid flat fingers extending outwardly from each of said channel members, the fingers on each channel member all being aligned and lying in a plane parallel to the axis of rotation of said cylindrical shell.

2. A corn picker comprising spaced inclined gathering elements, co-operating snapping rollers operatively mounted in the space between said gathering elements, the longitudinal axes of said snapping rollers being substantially parallel and disposed at a forwardly and downwardly inclined angle to the ground, said snapping rollers furthermore being so positioned that a transverse perpendicular line between their longitudinal axes is substantially parallel to the ground, a shaft operatively journaled in and extending transversely between the gathering elements, the longitudinal axis of said shaft being parallel to said transverse line between the longitudinal axes of the snapping rollers, said shaft also being mounted in upwardly spaced relation from said snapping rollers and adjacent to the upper end thereof, a shell-like member rigidly mounted on and carried by said shaft, channel members secured to the outer periphery of said shell-like member and extending substantially parallel to the axis of rotation of said shell-like member, and a plurality of rigid fingers extending outwardly from each of said channel members, the fingers on each channel member all being aligned and lying in a plane parallel to the axis of rotation of said shell-like member.

3. A corn picker comprising spaced inclined gathering elements, co-operating snapping rollers operatively mounted in the space between said gathering elements, a shaft journaled on said gathering elements and extending transversely across the space between said gathering elements, said shaft being perpendicular to the longitudinal axes of both of said snapping rollers and being located above said snapping rollers adjacent the upper end thereof, means for rotating said shaft in such a direction that the upper surface thereof moves in an upward direction with respect to the inclination of the snapping rollers and the downwardly presented surface of said shaft moves in a downward direction with respect to the inclination of said snapping rollers, a cylindrical member rigidly mounted on said shaft between said gathering elements, a plurality of channels mounted on said member and extending lengthwise therealong, and a plurality of rigid fingers secured to and extending outwardly from each of said channels, the fingers on each channel all being aligned and lying in a plane parallel to the axis of rotation of said shaft.

4. A corn picker comprising spaced inclined gathering elements, co-operating snapping rollers operatively mounted in the space between said gathering elements, the longitudinal axes of the snapping rollers being substantially parallel to each other and disposed at a forwardly and downwardly inclined angle to the ground, said snapping rollers furthermore being so positioned that a transverse perpendicular line between their longitudinal axes is substantially parallel to the ground, a shaft journaled on said gathering elements and extending transversely across the space between said gathering elements, said shaft being also substantially parallel to the ground and being located upwardly above and adjacent to the upper end of said snapping rollers, a cylindrical member rigidly mounted on said shaft between said gathering elements, four parallel channels mounted on said member ninety degrees apart and extending lengthwise therealong, a set of aligned fingers secured to each channel and extending outwardly therefrom, said fingers being substantially tangent to the cylindrical member and being substantially rigid throughout their length, and means for rotating the shaft with its cylindrical member and the fingers carried thereby in a direction such that the outer tips of the fingers move downwardly along an arcuate path from a position above and adjacent to the upper end of the snapping rollers toward the snapping rollers and pass downwardly from such position in a direction toward the lower end of the snapping rollers to a position directly above the snapping rollers and thence upwardly away from the snapping rollers whereby to engage any material which is clogged in or adjacent to the upper end of the snapping rollers and rake such material forwardly in the direction of the lower end of the snapping rollers.

References Cited in the file of this patent

UNITED STATES PATENTS 1,906,692    Lindgren et al. _____ May 2, 1933